UNITED STATES PATENT OFFICE.

GEORGES IMBERT, OF NUREMBERG, GERMANY.

PROCESS OF PRODUCING HYDROXY-FATTY ACIDS.

No. 901,905.  Specification of Letters Patent.  Patented Oct. 20, 1908.

Application filed July 25, 1906. Serial No. 327,748. (Specimens.)

*To all whom it may concern:*

Be it known that I, GEORGES IMBERT, a subject of the Emperor of Germany, residing at 54 Gugelstrasse, Nuremberg, Bavaria, Germany, have invented a certain new and useful Process for Producing Hydroxy-Fatty Acids, of which the following is a description.

The present invention consists of a process of producing hydroxy-fatty-acids.

Unsaturated fatty acids are converted into hydroxy-fatty acids by first treating them with chlorin or hypochlorous acid, and then heating under pressure the resultant chloro- or hydroxychloro-fatty-acids together with alkalies, alkaline carbonates or alkaline earths.

It is known that the chloro- and hydroxychloro-fatty acids can be converted into hydroxy-fatty acids by boiling them with caustic alkalies. The reaction, however, takes place very slowly, and is even still more retarded if the cheaper kinds of alkaline carbonates or alkaline earths are employed as a means for binding the hydrochloric acid. I have found that the reaction can be greatly accelerated by carrying out the heating with the above alkaline substances at an increased temperature under pressure of about 5 atmospheres, the output being at least 90% of the quantity of fatty acid used. This fact was not hitherto known nor could it be assumed, because under these conditions it might easily happen, that hydrochloric acid would be split off, and unsaturated fatty acids formed, instead of forming hydroxy-fatty acids, by replacing the chlorin by the hydroxyl group.

The necessary quantity of chlorin for forming the chloro- or hydroxychloro-fatty acids, may be determined by the iodin number of the fatty acids employed, the quantity is the same in both cases as is also the case with the necessary amount of alkali, since the production of the hydroxychloro-fatty acids is effected by introducing chlorin into the solution of the fatty acid containing superfluous carbonate. This results in the generation of hypochlorous acid, carbon dioxid being simultaneously developed. The hypochlorous acid immediately joins the salt of the unsaturated fatty acid forming a salt of hydroxychloro fatty acid.

The reactions may be expressed by the following equations (conversion of oleic acid to dioxy-stearic acid):—

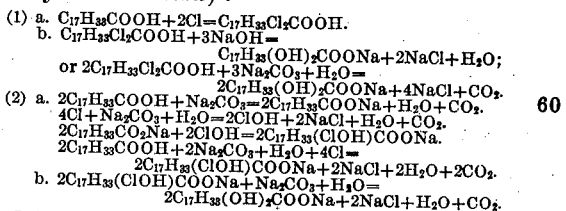

The following two examples will illustrate the method of carrying my improved process into practice.

*Example I:*—One kilogram of dichlorostearic acid is mixed with 350 gr. of caustic soda and 5 liters of water and the mass heated to 120° C. for 3 hours in an autoclave. The oxystearic acid may be precipitated out of the liquid obtained by means of acid.

*Example II:*—One kilogram of oleic acid is dissolved with 500 grams of soda in 5 liters of water, and into this solution is fed about 250 gr. of chlorin the whole being stirred the while, according to the iodin numbers of the oleic acid. The resulting solution of oxychloric stearate of sodium, which also contains soda and common salt, is heated to 150° C. in an autoclave for a period of 6 hours, the carbonic acid developing during this time being continuously blown off and the product is precipitated out, as specified.

The above described processes may be employed for the fatty acids of olive, cotton, linseed, sesame, castor oils and other oils, as also for cod liver oil and cocoanut fats, and the like, the alkali and chlorin being added in quantities governed by the iodin number of the fatty acids.

I claim as my invention:—

1. A process of producing hydroxy-fatty acids from unsaturated fatty acids which consists in first treating the latter with chlorin the whole being stirred the while heating the product under pressure with at least the theoretical quantity of an alkaline substance, driving off any carbon dioxid as it develops and precipitating out the hydroxy-fatty acid by means of a mineral acid.

2. A process of producing hydroxy-fatty acids, which consists in first treating the solutions of an unsaturated fatty acid in the presence of the theoretical quantity of alkali carbonate with chlorin, the whole being stirred the while, heating the resultant mass under pressure with at least the theoretical quantity of alkali carbonate, driving off the carbon dioxid as it develops and precipitating out as specified.

In testimony whereof I affix my signature in the presence of two witnesses.

GEORGES IMBERT.

Witnesses:
 EUGEN SALITZCERSTEIN,
 ERICH BAUM.